US012640443B2

(12) United States Patent
Kozuki et al.

(10) Patent No.: US 12,640,443 B2
(45) Date of Patent: May 26, 2026

(54) ELECTRICAL STORAGE MODULE

(71) Applicant: Panasonic Intellectual Property Management Co., Ltd., Osaka (JP)

(72) Inventors: Kiyomi Kozuki, Osaka (JP); Toshiyasu Kitamura, Osaka (JP); Goro Fujita, Osaka (JP); Kasumi Sato, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 601 days.

(21) Appl. No.: 17/906,482

(22) PCT Filed: Mar. 26, 2021

(86) PCT No.: PCT/JP2021/013079
§ 371 (c)(1),
(2) Date: Sep. 16, 2022

(87) PCT Pub. No.: WO2021/200738
PCT Pub. Date: Oct. 7, 2021

(65) Prior Publication Data
US 2023/0137433 A1     May 4, 2023

(30) Foreign Application Priority Data
Mar. 31, 2020     (JP) ................................. 2020-062806

(51) Int. Cl.
*H01M 50/517*          (2021.01)
*H01M 50/15*           (2021.01)
(Continued)

(52) U.S. Cl.
CPC ......... *H01M 50/517* (2021.01); *H01M 50/15* (2021.01); *H01M 50/209* (2021.01);
(Continued)

(58) Field of Classification Search
CPC .................................................. H01M 50/503
See application file for complete search history.

(56) References Cited

U.S. PATENT DOCUMENTS

| | | |
|---|---|---|
| 2010/0173178 A1 | 7/2010 | Kim et al. |
| 2015/0171404 A1 | 6/2015 | Kwon |
| 2015/0380711 A1 | 12/2015 | Oechsle et al. |

FOREIGN PATENT DOCUMENTS

| | | |
|---|---|---|
| CN | 106784573 A | 5/2017 |
| DE | 102013213710 A1 | 1/2015 |

(Continued)

OTHER PUBLICATIONS

International Search Report of PCT application No. PCT/JP2021/013079 dated May 18, 2021.

(Continued)

*Primary Examiner* — Allison Bourke
*Assistant Examiner* — Kayla Elaine Clary
(74) *Attorney, Agent, or Firm* — Rimon P.C.

(57)     ABSTRACT

An electrical storage module includes: a plurality of electrical storage devices; and a bus bar that connects electrode terminals of the electrical storage devices to each other, in which the electrical storage device includes an outer covering can in which an opening is formed, and a plate-shaped sealing body that is provided with the electrode terminal and is inserted into the opening of the outer covering can, the electrode terminal has a container that includes a through-hole or a recess that is formed in a direction substantially orthogonal to a direction in which the sealing body is inserted into the outer covering can, and the bus bar includes a press-fitting portion that is press-fitted into the container.

18 Claims, 6 Drawing Sheets

Vertical direction
Depth direction
Width direction

(51) Int. Cl.
  H01M 50/209     (2021.01)
  H01M 50/503     (2021.01)
  H01M 50/522     (2021.01)
  H01M 50/553     (2021.01)

(52) U.S. Cl.
  CPC ....... H01M 50/503 (2021.01); H01M 50/522 (2021.01); H01M 50/553 (2021.01)

(56)        References Cited

FOREIGN PATENT DOCUMENTS

| EP | 2648243 | A1 | | 10/2013 |
|----|---------|----|----|---------|
| JP | 2003-249207 | A | | 9/2003 |
| JP | 2008-300083 | A | | 12/2008 |
| JP | 2010-161075 | | | 7/2010 |
| JP | 2011-154898 | | | 8/2011 |
| JP | 2014179196 | A | * | 9/2014 |
| JP | 2015065066 | A | * | 4/2015 |
| JP | 2017130338 | A | * | 7/2017 |

OTHER PUBLICATIONS

The EPC Office Action dated Jan. 26, 2024 for the related European Patent Application No. 21780820.3.

1 The EPC Office Action dated Aug. 4, 2023 for the related European Patent Application No. 21780820.3.

* cited by examiner

Vertical direction

Depth direction

Width direction

Vertical direction

Depth direction

Width direction

Vertical direction

Depth direction

40

40A

40A

40B

40B

40C

40C

Vertical direction

Depth direction

Width direction

ELECTRICAL STORAGE MODULE

CROSS-REFERENCE TO RELATED APPLICATIONS

This application is a U.S. national stage application of the PCT International Application No. PCT/JP2021/013079 filed on Mar. 26, 2021, which claims the benefit of foreign priority of Japanese patent application No. 2020-062806 filed on Mar. 31, 2020, the contents all of which are incorporated herein by reference.

TECHNICAL FIELD

The present disclosure relates to an electrical storage module.

BACKGROUND ART

It is known to use an electrical storage module in which a plurality of electrical storage devices are electrically connected by a bus bar in order to obtain a predetermined energy capacity. For example, an electrical storage module disclosed in PTL 1 includes a bus bar that connects electrode terminals of a plurality of electrical storage devices, and the bus bar is joined to the electrode terminal by welding when the bus bar is attached to the electrode terminal.

CITATION LIST

Patent Literature

PTL 1: Unexamined Japanese Patent Publication No. 2010-161075

SUMMARY OF THE INVENTION

However, if the bus bar is joined by welding when attached to the electrode terminal in the electrical storage module, it is difficult to disassemble the electrical storage device and the bus bar and reassemble the electrical storage module in the process of manufacturing the electrical storage module.

An object of the present disclosure is to provide an electrical storage module that can be reassembled.

An electrical storage module that is one aspect of the present disclosure is an electrical storage module including: a plurality of electrical storage devices; and a bus bar that connects electrode terminals of the electrical storage devices to each other, in which the electrical storage device includes an outer covering can in which an opening is formed, and a plate-shaped sealing body that is provided with the electrode terminal and is inserted into the opening of the outer covering can, the electrode terminal has a container that includes a through-hole or a recess that is formed in a direction substantially orthogonal to a direction in which the sealing body is inserted into the outer covering can, and the bus bar includes a press-fitting portion that is press-fitted into the container when attached to the electrode terminal.

According to one aspect of the present disclosure, it becomes easy to remove a bus bar from an electrode terminal as compared with an electrical storage module in which the bus bar and the electrode terminal are joined to each other by welding. By press-fitting the press-fitting portion of the bus bar into the electrode terminal, it is possible to reduce connection resistance between the bus bar and the electrode terminal. Furthermore, by making the direction in which the press-fitting portion is press-fitted into the container of the electrode terminal different from the direction in which the sealing body is inserted into the outer covering can, it is possible to suppress mechanical stress generated at a joint between the sealing body and a case when the press-fitting portion is press-fitted into the container.

DESCRIPTION OF EMBODIMENT

Hereinafter, an exemplary embodiment of the present disclosure will be described with reference to the drawings. The shapes, materials, and numbers described below are examples, and can be appropriately changed according to the specifications of the electrical storage module. In the following description, the equivalent elements are given the identical reference marks in all drawings.

Hereinafter, for convenience of description, a direction in which the sealing body is inserted into the opening of the outer covering can is defined as a vertical direction, a direction substantially orthogonal to the vertical direction and in which a storage of the electrode terminal is formed is defined as a width direction, and a direction substantially orthogonal to the vertical direction and the width direction and in which the electrical storage devices are arranged in the electrical storage module is defined as a depth direction.

Figure 1:
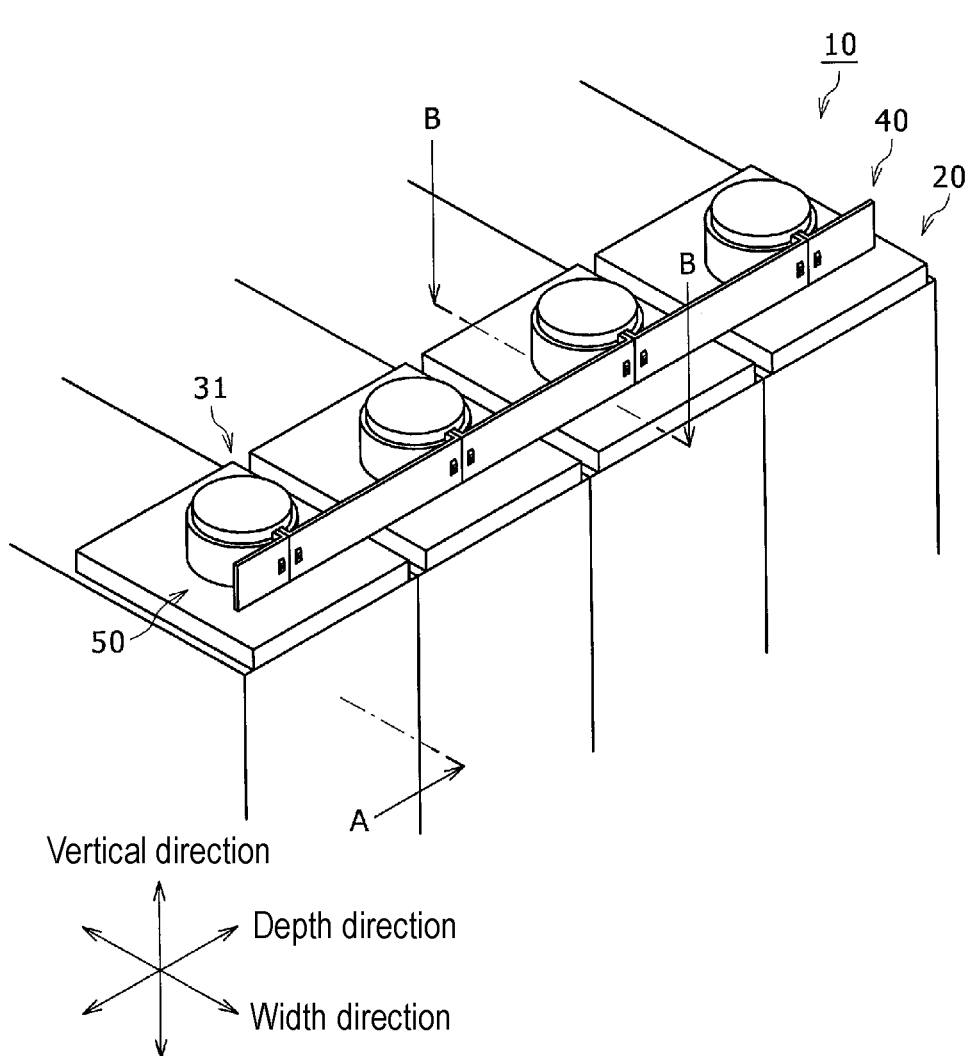
FIG. 1 is a perspective view of an electrical storage module that is an example of an exemplary embodiment.

Electrical storage module 10, which is an example of an exemplary embodiment, will be described with reference to FIG. 1. FIG. 1 is a perspective view showing electrical storage module 10.

Electrical storage module 10 is used in, for example, a driving power source of an electric vehicle or a hybrid vehicle, or a stationary electrical storage system for peak shifting of system power. As shown in FIG. 1, electrical storage module 10 includes: a plurality of electrical storage devices 20 arranged side by side in a depth direction; bus bar 40 connecting positive-electrode terminals 31 or negative-electrode terminals 32 (see FIG. 2) of electrical storage devices 20 to each other; and fixing member 50 connecting positive-electrode terminal 31 and bus bar 40 or negative-electrode terminal 32 and bus bar 40 to each other.

Figure 2:
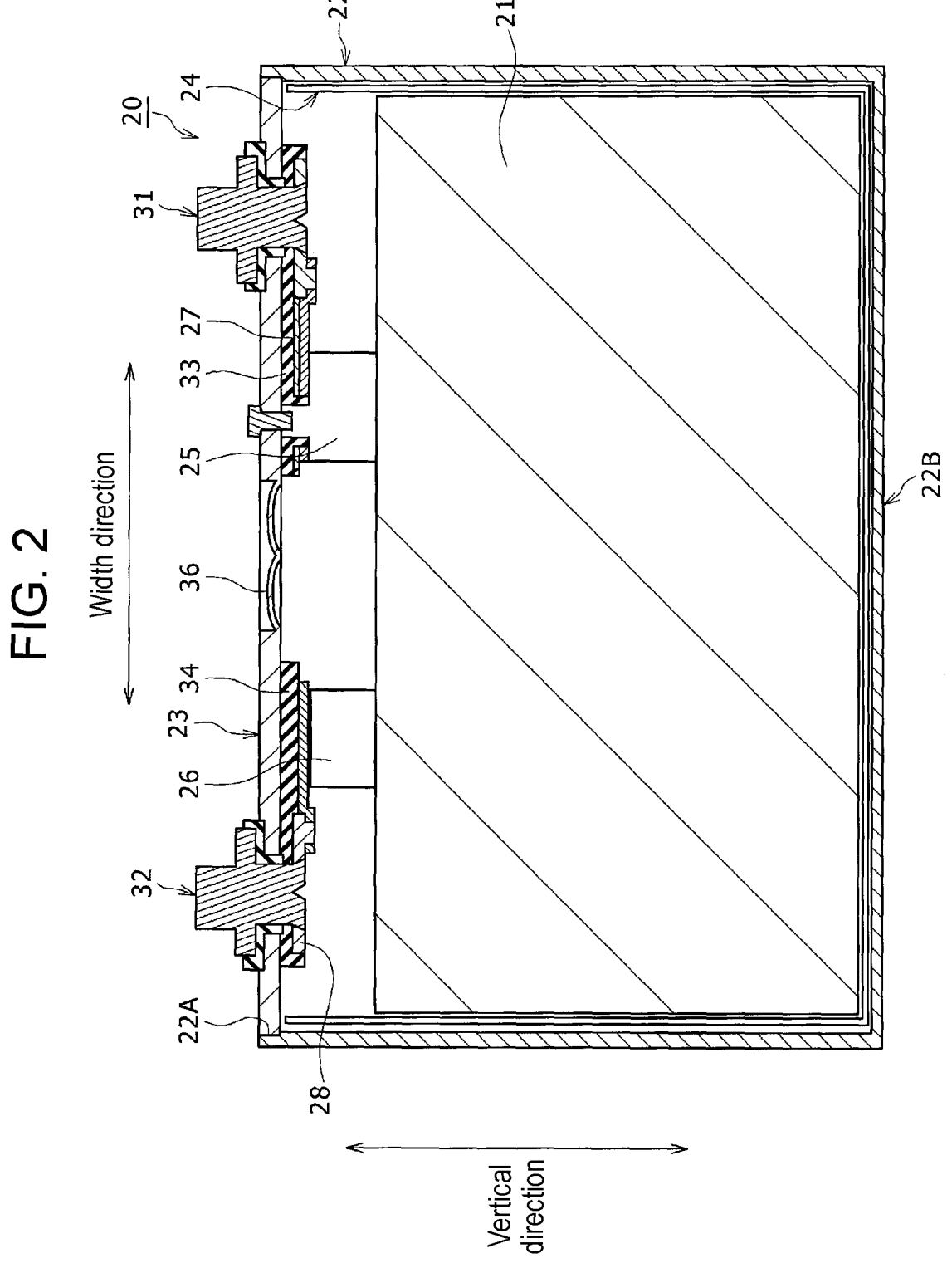
FIG. 2 is an AA cross-sectional view of FIG. 1.

Electrical storage device 20, which is an example of the exemplary embodiment, will be described with reference to FIG. 2. FIG. 2 is an AA cross-sectional view of FIG. 1.

Electrical storage device 20 is a non-aqueous electrolyte secondary battery, and a preferred example thereof is a lithium ion battery. Electrical storage device 20 may be a nickel hydride battery, an electric double layer capacitor, or the like. As shown in FIG. 2, electrical storage device 20 includes: electrode body 21 in which a positive electrode plate and a negative electrode plate are laminated via a separator; outer covering can 22 in which electrode body 21 and an electrolyte solution are contained; and sealing body 23 in which opening 22A of outer covering can 22 is inserted from above in the vertical direction to close the opening.

Electrode body 21 is formed by laminating a substantially rectangular sheet-like positive electrode plate, a negative electrode plate, and a separator. The laminated positive electrode plate, the negative electrode plate, and the separator may be fixed by bonding the positive electrode plate or the negative electrode plate to the separator by applying an adhesive to a surface of the separator opposing the positive electrode plate or the negative electrode plate, which is restrained using a fixing tape. Electrode body 21 is contained in insulating holder 24 in a substantially rectangular-parallelepiped shape having a bottom and having an upper end opened. Electrode body 21 is disposed in outer covering can 22 such that a lamination direction in which the positive electrode plate and the negative electrode plate are laminated is parallel to the depth direction of outer covering can 22. In electrode body 21, a band-shaped positive electrode plate and a band-shaped negative electrode plate may be wound via a band-shaped separator to form a wound body, and the wound body may be flattened to form a flat wound body. At this time, the lamination direction of electrode body 21 may be a thickness direction of the flat wound body.

The positive electrode plate includes, for example, a core body made of an aluminum foil having a thickness of 15 μm, electrode layers formed on front and back surfaces of the core body, a core body exposed part where no electrode layer is formed in the core body, and positive electrode lead 25, which is a part of the core body exposed part and is formed to extend from an upper end of the core body exposed part.

The electrode layer of the positive electrode contains, for example, an active material, a conductive agent, and a binder. Lithium-nickel-cobalt-manganese composite oxide can be used as an active material of the positive electrode, polyvinylidene fluoride (PVdF) can be used as a binder, a carbon material can be used as a conductive agent, and N-methylpyrrolidone (NMP) can be used as a dispersion medium. When forming the electrode layer, a slurry containing the active material, the conductive agent, the binder, and the dispersant is prepared. The slurry is applied on both surfaces of the core body of the positive electrode. Then, by drying, the dispersion medium in the slurry is removed, and an electrode layer is formed on the core body. Thereafter, the electrode layer is compressed to have a predetermined thickness. The thus obtained positive electrode plate is cut into a predetermined shape.

The negative electrode plate includes, for example, a core body made of a copper foil having a thickness of 8 μm, electrode layers formed on front and back surfaces of the core body, a core body exposed part where no electrode layer is formed in the core body, and negative electrode lead 26, which is a part of the core body exposed part and is formed to extend from an upper end of the core body exposed part.

The electrode layer of the negative electrode contains, for example, an active material, a conductive agent, a binder, and a thickener. Graphite can be used as an active material of the negative electrode, styrene butadiene rubber (SBR) can be used as a binder, carboxymethyl cellulose (CMC) can be used as a thickener, and water can be used as a dispersion medium. When forming the electrode layer, a slurry containing the active material, the conductive agent, the binder, and the thickener is prepared. The slurry is applied on both surfaces of the core body of the negative electrode. Then, by drying, the dispersion medium in the slurry is removed, and an electrode layer is formed on the core body. Thereafter, the electrode layer is compressed to have a predetermined thickness. The thus obtained negative electrode plate is cut into a predetermined shape.

For example, a resin separator can be used as the separator, and polyolefin, polyethylene, or polypropylene can be used as the resin.

Positive electrode lead 25 is electrically connected to positive-electrode terminal 31 provided on sealing body 23 via current collecting member 27. Positive electrode lead 25 is provided by the number of positive electrode plates constituting electrode body 21. The plurality of positive electrode leads 25 are each joined to current collecting member 27 in a bundled state near the tip end in the extending direction. When positive electrode lead 25 is joined to current collecting member 27, positive electrode lead 25 can be joined to current collecting member 27 by performing ultrasonic welding, resistance welding, laser welding, cold welding, or the like.

Negative electrode lead 26 is electrically connected to negative-electrode terminal 32 provided on sealing body 23 via current collecting member 28. Negative electrode lead 26 is provided by the number of negative electrode plates constituting electrode body 21. The plurality of negative electrode leads 26 are each joined to current collecting member 28 in a bundled state near the tip end in the extending direction. When negative electrode lead 26 is each joined to current collecting member 28, negative electrode lead 26 can be joined to current collecting member 28 by performing ultrasonic welding, resistance welding, laser welding, cold welding, or the like.

Current collecting member 27 of the positive electrode is made of, for example, an aluminum plate material. Current collecting member 27 is connected to positive electrode lead 25 at one end and is connected to positive-electrode terminal 31 at the other end. Insulating member 33 is interposed between current collecting member 27 and sealing body 23.

Positive-electrode terminal 31 and current collecting member 27 may be electrically connected via a current interrupting device (CID). The CID is a safety device capable of cutting off electrical connection between current collecting member 27 and positive-electrode terminal 31 when gas is generated inside outer covering can 22 at the time of abnormality of electrical storage device 20 and the inside of outer covering can 22 exceeds a predetermined pressure. The CID includes, for example, a reversing plate that is connected to the other end of current collecting member 27 and deforms in a direction away from current collecting member 27 when receiving pressure in outer covering can 22, and a conductive cap that electrically connects the reversing plate and positive-electrode terminal 31. The conductive cap is a dish-shaped conductive member having an opening positioned on the lower side (electrode body 21 side) and an upper surface positioned on the upper side (sealing body 23 side). A connection hole is formed on the upper surface, and positive-electrode terminal 31 is inserted.

Current collecting member 28 of the negative electrode is made of, for example, a copper plate material. Current collecting member 28 is connected to negative electrode lead 26 at one end and connected to negative-electrode terminal 32 at the other end. Insulating member 34 is interposed between current collecting member 28 and sealing body 23.

Exterior can 22 is, for example, a rectangular case provided with bottom 22B, a side wall having a rectangular tube shape erected from a peripheral edge of bottom 22B, and opening 22A at an end opposite to bottom 22B (upper side in the vertical direction). Exterior can 22 is made of metal, for example, aluminum. Exterior can 22 can be formed by, for example, drawing an aluminum material.

In sealing body 23, positive-electrode terminal 31 and negative-electrode terminal 32 are disposed apart from each other in a long direction (width direction) of sealing body 23. Positive-electrode terminal 31 and negative-electrode terminal 32 are provided to protrude upward in the vertical direction and protrude from the top surface of sealing body 23. Sealing body 23 is formed by, for example, processing an aluminum plate. Sealing body 23 is positioned on opening 22A of outer covering can 22, and sealing body 23 can seal the inside of outer covering can 22 by forming a joint by welding an opening end of outer covering can 22 using, for example, a laser or the like.

Sealing body 23 may have a filling hole for filling an electrolyte solution into outer covering can 22. Sealing body 23 may be provided with a filling plug that closes the filling hole. Sealing body 23 may be surrounded by a plurality of linear grooves, and may be provided with pressure regulating valve 36 that discharges the gas inside outer covering can 22 to the outside by tearing the grooves when the inside of outer covering can 22 exceeds a predetermined pressure. It is preferable to form an annular groove along the peripheral edge on the top surface of sealing body 23. This configuration makes it possible to efficiently melt the peripheral edge of sealing body 23 when sealing body 23 and opening 22A of outer covering can 22 are joined by welding.

Positive-electrode terminal 31 is provided to penetrate a terminal hole of sealing body 23, and has one end protruding to the outside of outer covering can 22 and the other end contained in outer covering can 22. Positive-electrode terminal 31 is fixed to the conductive cap by having the other end inserted into a connection hole provided on the upper surface of the conductive cap, and the other end crimped so as to expand in a radial direction. Positive-electrode terminal 31 includes, for example, a columnar body or a cylindrical body made of aluminum.

Negative-electrode terminal 32 is provided to penetrate a terminal hole of sealing body 23, and has one end exposed to the outside of outer covering can 22 and the other end contained in outer covering can 22. Negative-electrode terminal 32 may include, for example, a clad material in which the other end connected to current collecting member 28 in outer covering can 22 is made of a copper material and one end exposed to the outside of outer covering can 22 is made of aluminum. Negative-electrode terminal 32 is fixed to sealing body 23 together with current collecting member 28 by being crimped so as to spread in the radial direction at the other end.

Hereinafter, when a feature common to positive-electrode terminal 31 and negative-electrode terminal 32 is described, it is simply described as electrode terminal 30.

Figure 3:
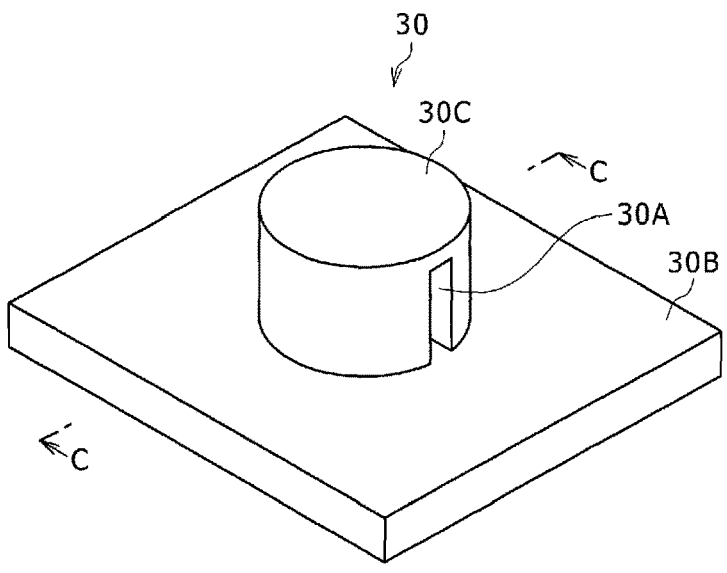
FIG. 3 is a perspective view of an electrode terminal that is an example of an exemplary embodiment.
Figure 3:
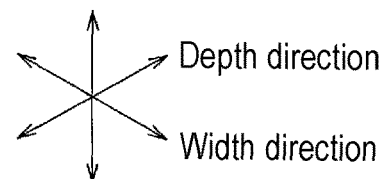
Figure 4:
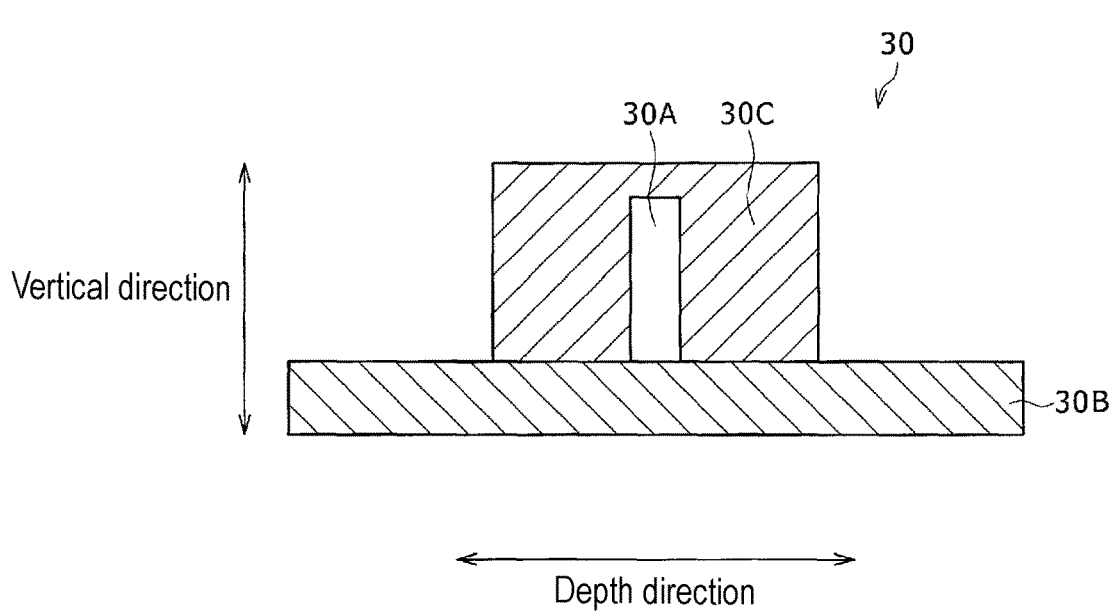
FIG. 4 is a CC cross-sectional view of FIG. 3.

Electrode terminal 30, which is an example of the present exemplary embodiment, will be described with reference to FIGS. 3 to 5. FIG. 3 is a perspective view showing electrode terminal 30, and FIG. 4 is a CC cross-sectional view of FIG. 3.

As shown in FIG. 3, electrode terminal 30 is provided to protrude upward in the vertical direction of electrical storage device 20. Electrode terminal 30 has container 30A including a through-hole and a recess formed in the width direction. As shown in FIG. 4, the cross-sectional shape perpendicular to the direction in which container 30A extends (in the width direction of the electrical storage device, in a direction of connecting the opening and the bottom of the container in a case of a bottomed container, or in a direction of connecting openings at both ends in a case where the container is a through-hole) may be rectangular. The cross-sectional shape of container 30A perpendicular to the vertical direction may be rectangular. The cross-sectional shape of container 30A perpendicular to the vertical direction may be formed such that the opening end on the outside in the width direction (insertion side of press-fitting portion 40A) is wide. Thus, press-fitting portion 40A can be easily press-fitted. The cross-sectional shape of container 30A perpendicular to the vertical direction may be a tapered shape, and may be, for example, a trapezoid or a triangle.

Figure 5:
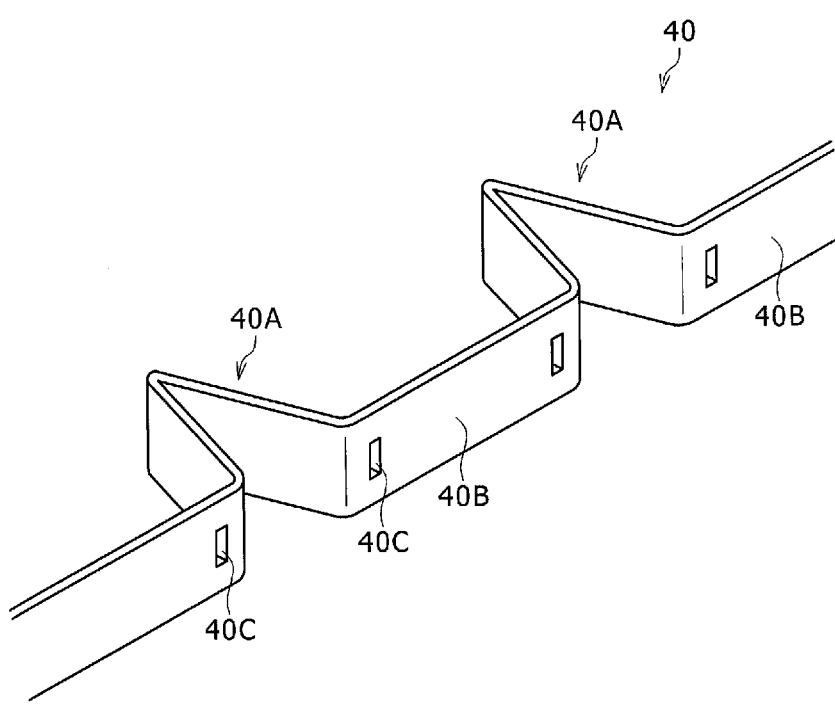
FIG. 5 is a perspective view of a bus bar that is an example of an exemplary embodiment.
Figure 5:
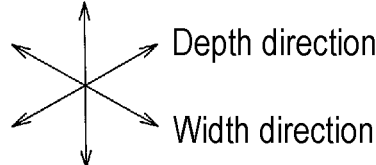

As shown in FIG. 5, electrode terminal 30 includes, for example, base 30B formed in a flat plate shape and terminal portion 30C formed in a cylindrical shape. As a method of manufacturing electrode terminal 30, a recess or the like may be formed on a bottom surface of terminal portion 30C by cutting or casting, for example, the bottom surface of terminal portion 30C and base 30B may be joined by welding, and a recess or a through-hole defined by the recess and base 30B as container 30A. Electrode terminal 30 facilitates processing of forming container 30A in terminal portion 30C. The welding is preferably performed by spot welding at a plurality of locations, for example. In electrode terminal 30, container 30A may be formed by cutting or the like a conductive member in which terminal portion 30C and base 30B are integrated. A lower flange (not illustrated) may be formed on an outer peripheral surface of terminal portion 30C near base 30B, and the lower flange and base 30B may be joined by welding or the like.

Figure 6:
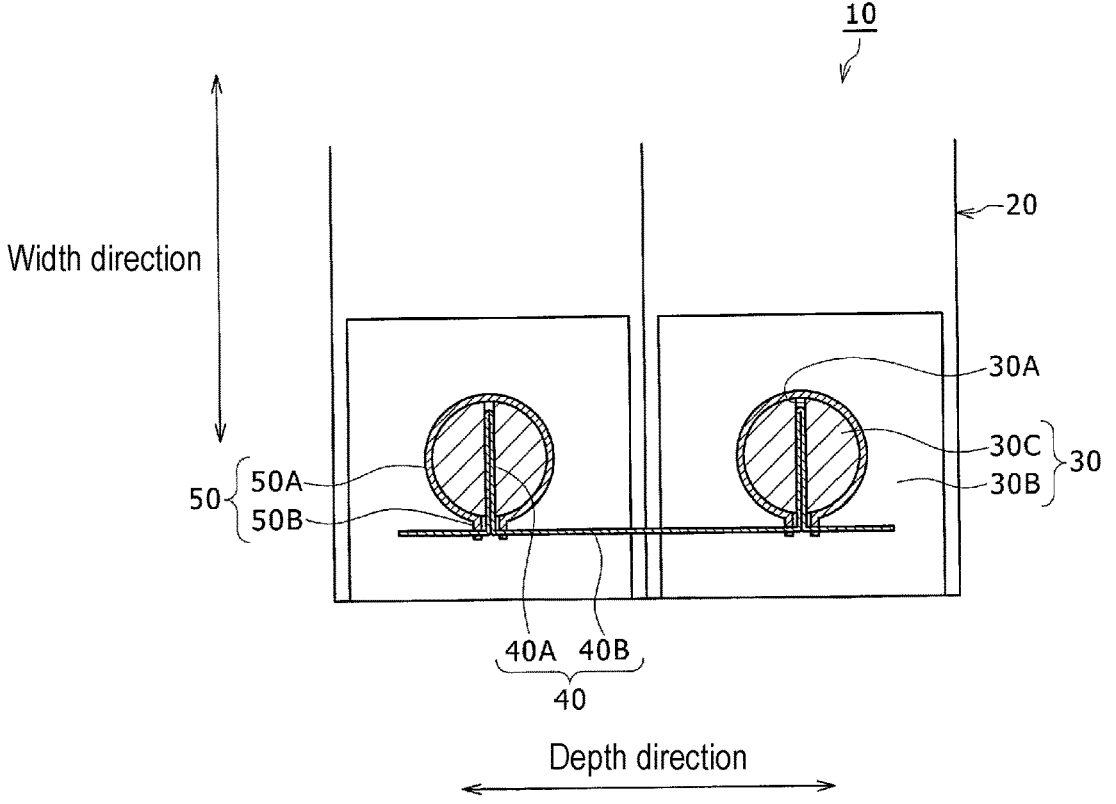
FIG. 6 is a BB cross-sectional view of FIG. 1.

Bus bar 40, which is an example of the present exemplary embodiment, will be described with reference to FIGS. 5 and 6. FIG. 5 is a perspective view showing bus bar 40. FIG. 6 is a BB cross-sectional view of FIG. 1.

Bus bar 40 is a conductor used for electrical connection between positive-electrode terminals 31 or negative-electrode terminals 32. As shown in FIG. 5, bus bar 40 is formed by bending a long metal sheet having conductivity. Bus bar 40 is detachable from electrode terminal 30 from the outside in the width direction of the plurality of electrical storage devices 20. Bus bar 40 includes press-fitting portion 40A press-fitted into container 30A of electrode terminal 30, and connecting portion 40B that connects adjacent press-fitting portions 40A to each other.

As shown in FIG. 5, before bus bar 40 is attached to electrode terminal 30 (before press-fitting portion 40A is press-fitted into container 30A), press-fitting portion 40A may be formed by folding back a metal sheet forming press-fitting portion 40A so as to have a substantially V shape when viewed in the vertical direction. When bus bar 40 is attached to electrode terminal 30, press-fitting portion 40A is press-fitted toward inside container 30A.

Press-fitting is to push press-fitting portion 40A toward container 30A with more than or equal to a predetermined pressure in the width direction. In order to press-fit press-fitting portion 40A into container 30A, it is preferable that the size of press-fitting portion 40A in the depth direction before press-fitting is larger than the size of container 30A in the depth direction. Press-fitting portion 40A press-fitted into container 30A is held between a pair of inner surfaces opposing each other in the depth direction in container 30A. At this time, a reaction force acts on the pair of inner surfaces of the pair of metal sheets constituting the press-fitting portion due to flexibility (or, elasticity or spring property) in the depth direction. Due to this, press-fitting portion 40A and the pair of inner surfaces of container 30A press each other. Therefore, the connection resistance between press-fitting portion 40A and container 30A is reduced.

Due to this, when bus bar 40 is attached to electrode terminal 30, although more than or equal to a predetermined load acts in the width direction by press-fitting, the load is suppressed from acting in the vertical direction (direction in which sealing body 23 is inserted into outer covering can 22). Therefore, it is possible to suppress application of mechanical stress to the joint due to welding between outer covering can 22 and sealing body 23.

Since bus bar 40 is detachable from electrode terminal 30, it is possible to redo the work of attaching bus bar 40 to electrode terminal 30 in the manufacturing process of electrical storage module 10. Furthermore, bus bar 40 can be reused at the time of disposal of electrical storage module 10.

Connecting portion 40B is a portion that connects adjacent press-fitting portions 40A to each other as described above. The part of connecting portion 40B close to press-fitting portion 40A is provided with hole 40C into which insertion portion 50B of fixing member 50 is inserted. Hole 40C is preferably formed in a rectangular shape.

As shown in FIG. 6, after bus bar 40 is attached to electrode terminal 30 (after press-fitting portion 40A is press-fitted into container 30A), the metal sheets forming press-fitting portion 40A are press-fitted into container 30A in a closed state. In this state, the metal sheet forming press-fitting portion 40A and the inner surface of container 30A opposing the metal sheet reliably abut on each other due to restoring force of returning the metal sheets forming press-fitting portion 40A from the closed state to the V shape. This makes it possible to sufficiently secure a contact area between container 30A and press-fitting portion 40A.

The size of press-fitting portion 40A in the width direction is not particularly limited, but is preferably substantially identical to the diameter of terminal portion 30C of electrode terminal 30. The size of press-fitting portion 40A in the vertical direction is preferably smaller than the size of container 30A of electrode terminal 30 in the vertical direction.

Figure 7:
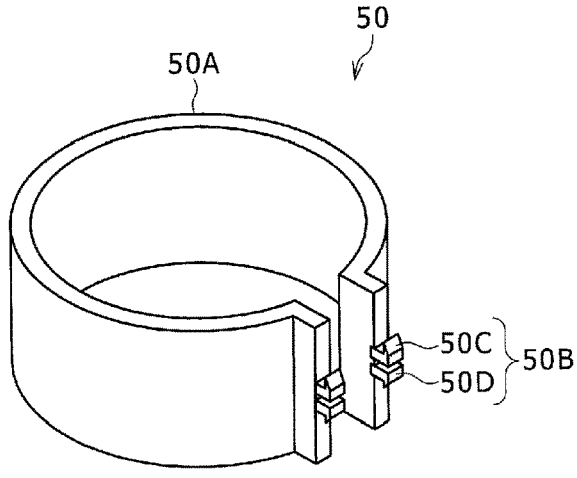
FIG. 7 is a perspective view of a fixing member that is an example of an exemplary embodiment.
Figure 7:
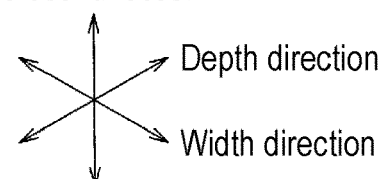

Fixing member 50, which is an example of the present exemplary embodiment, will be described with reference to FIGS. 6 and 7. FIG. 7 is a perspective view showing fixing member 50.

Fixing member 50 is a member that fixes electrode terminal 30 and bus bar 40. According to fixing member 50, it is possible to prevent bus bar 40 from falling off from electrode terminal 30. Fixing member 50 may be made of an insulating material having elasticity (or flexibility) or may be made of a metal material. As shown in FIGS. 6 and 7, fixing member 50 includes fitting portion 50A fitted to the side peripheral surface of terminal portion 30C of electrode terminal 30, and insertion portion 50B to be inserted into hole 40C formed in bus bar 40.

Fitting portion 50A is a band-shaped member curved so as to be formed in a substantially annular shape when viewed in the vertical direction, for example. The substantially annular diameter of fitting portion 50A as viewed in the vertical direction is preferably smaller than the diameter of electrode terminal 30. When fixing member 50 is attached to electrode terminal 30, fitting portion 50A is preferably fitted to terminal portion 30C from above. Fitting portion 50A preferably abuts on substantially the entire circumference of the side peripheral surface of terminal portion 30C, but may have a configuration of abutting on only a part of the side peripheral surface of terminal portion 30C. In this case, fitting portion 50A is formed in, for example, a substantially U shape when viewed in the vertical direction. Instead of band-shaped fitting portion 50A as shown in FIGS. 6 and 7, a recess formed by cutting out a part of the peripheral edge of a block body may be adopted. At this time, fitting portion 50A does not have flexibility or elasticity, and may be firmly fixed by making the inner dimension of a cavity defined by fitting portion 50A and bus bar 40 at the time of connecting and fixing fixing member 50 and bus bar 40 smaller than the outer dimension of the electrode terminal. Even if fitting portion 50A has a band shape, it may be fixed by a difference between the inner dimension of the cavity and the outer dimension of the terminal of the electrode. When fixing member 50 is used, a flange may be provided at a position above fitting portion 50A on the outer peripheral surface of electrode terminal 30, and this flange may overlap fitting portion 50A when viewed from above the electrical storage device. With this configuration, fitting portion 50A is disposed between this flange and base 30B of electrode terminal 30. Therefore, vertical displacement of fitting portion 50A by the electrode terminal can be suppressed. Then, it is possible to suppress vertical displacement of bus bar 40 via fixing member 50.

Insertion portion 50B is formed on an outer end surface of fixing member 50 in the width direction. Insertion portion 50B includes an upper insertion portion formed on the upper side in the vertical direction and a lower insertion portion formed on the lower side in the vertical direction. The upper insertion portion and the lower insertion portion are formed at a gap to each other. The upper insertion portion has upper locking portion 50C formed so as to protrude upward near the tip end of the upper insertion portion. The lower insertion portion has lower locking portion 50D formed so as to protrude downward near the tip end of the lower insertion portion. Note that insertion portion 50B may be only one of the upper insertion portion and the lower insertion portion as long as the connection strength is maintained.

When fixing member 50 is attached to bus bar 40, insertion portion 50B is inserted into hole 40C of bus bar 40, and upper locking portion 50C and lower locking portion 50D are each locked to an outer opening edge portion of hole 40C in the width direction, thereby fixing fixing member 50 to bus bar 40. This makes it possible to suppress displacement of bus bar 40 in the width direction (direction in which container 30A extends) when electrode terminal 30 and bus bar 40 are fixed to each other by fixing member 50 and, in particular, when electrical storage module 10 is vibrated. Then, it is possible to suppress bus bar 40 from falling off from electrode terminal 30.

Figure 8:
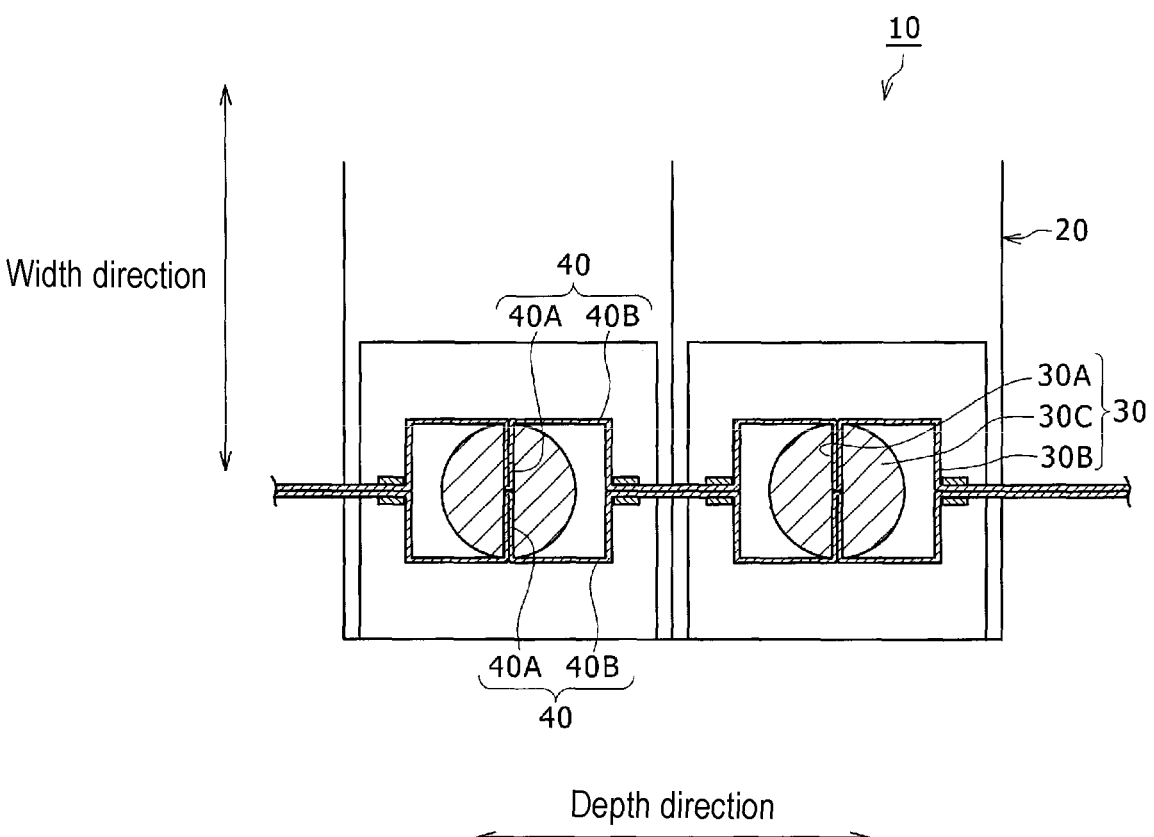
FIG. 8 is a cross-sectional view that is another example of an exemplary embodiment.

As shown in FIG. 8, in a case where container 30A includes a through-hole, connection may be performed using a pair of bus bars 40 with respect to one electrode terminal 30. In this case, press-fitting portion 40A of each bus bar 40 may be inserted from the openings at both ends of container 30A. This configuration makes it possible to reduce the press-fitting depth of one bus bar in a case where the total press-fitting depth is the same, as compared with a configuration in which one bus bar is used for one electrode terminal 30. Therefore, the area of press-fitting portion 40A of one bus bar 40 in contact with container 30A is reduced. Therefore, frictional resistance at one place of press-fitting portion 40A is reduced, and the burden of work due to one press fitting of bus bar 40 can be reduced. As shown in FIG. 8, connecting portions 40B of the pair of bus bars 40 may be bundled together by a restraining member or the like. This configuration makes it possible to suppress bus bar 40 fixed to electrode terminal 30 from displacing in the width direction.

According to electrical storage module 10, by press-fitting press-fitting portion 40A of bus bar 40 into container 30A of electrode terminal 30 in the width direction, it is possible to suppress the load from acting in the vertical direction (direction in which sealing body 23 is inserted into outer covering can 22). Therefore, it is possible to suppress the mechanical stress generated at the joint between outer covering can 22 and sealing body 23.

According to electrical storage module 10, since press-fitting portion 40A is press-fitted into container 30A, the metal sheet forming press-fitting portion 40A and the inner surface of container 30A opposing the metal sheet reliably abut on each other. This makes it possible to sufficiently secure a contact area between container 30A and press-fitting portion 40A. As a result, the contact resistance between container 30A and press-fitting portion 40A can be reduced, and the heat generation amount when a large current flow through bus bar 40 can be reduced.

Furthermore, according to electrical storage module 10, electrode terminal 30 and bus bar 40 are joined to each other by fixing member 50, and in particular, when electrical storage module 10 vibrates, it is possible to avoid bus bar 40 from falling off from electrode terminal 30.

Note that the present invention is not limited to the above-described exemplary embodiments and modified examples thereof, and it is a matter of course that various changes and improvements can be made within the scope of the matters described in the claims of the present application.

REFERENCE MARKS IN THE DRAWINGS

10 electrical storage module
20 electrical storage device
21 electrode body
22 outer covering can
22A opening
22B bottom
23 sealing body
24 insulating holder
25 positive electrode lead
26 negative electrode lead
27 current collecting member
28 current collecting member
30 electrode terminal
30A container
30B base
30C terminal portion
31 positive-electrode terminal
32 negative-electrode terminal
33 insulating member
34 insulating member
36 pressure regulating valve
40 bus bar
40A press-fitting portion
40B connecting portion
40C hole
50 fixing member
50A fitting portion
50B insertion portion
50C upper locking portion
50D lower locking portion

The invention claimed is:

1. An electrical storage module comprising:
a plurality of electrical storage devices arranged in a first direction; and
a bus bar that connects electrode terminals of the plurality of electrical storage devices to each other, wherein:
each of the plurality of electrical storage devices includes an outer covering can including an opening, and a sealing body that is provided with a corresponding one of the electrode terminals and is inserted into the opening of the outer covering can and the sealing body being plate-shaped,
each of the electrode terminals has a columnar shape protruding along a second direction in which the sealing body is inserted into the outer covering can of a corresponding one of the plurality of storage devices and crosses the first direction and having a side peripheral surface extending in the second direction,
each of the electrode terminals includes a container that is disposed at the side peripheral surface and the container includes a through-hole or a recess extending in a third direction substantially orthogonal to the second direction,
the through-hole or the recess of each of the electrode terminals has an opening, which opens to the side peripheral surface,
the opening of the through-hole or the recess of each of the electrode terminals has a width in the first direction and a length in the second direction,
the through-hole or the recess of each of the electrode terminals has a depth in the third direction,
the bus bar includes press-fitting portions, a corresponding one of the press-fitting portions is press-fitted along the third direction into the container of each of the electrode terminals, and
the corresponding one of the press-fitting portions is formed by bending a long metal sheet, and is formed in a substantially V shape having an apex before the corresponding one of the press-fitting portions is press-fitted into the container, and the apex is inserted into the through-hole or the recess of the container.

2. The electrical storage module according to claim 1, wherein the container extends in a direction intersecting a direction in which a plurality of the electrical storage devices are arranged.

3. The electrical storage module according to claim 1, wherein:
the through-hole or the recess of the container includes inner surfaces facing with each other, and
a portion of the corresponsing one of the press-fitting portions formed in a substantially V shape abuts on the inner surfaces of the through-hole or the recess of the container.

4. The electrical storage module according to claim 1, further comprising at least one fixing member that fixes each of the electrode terminals and the bus bar.

5. The electrical storage module according to claim 4, wherein the at least one fixing member is disposed to surround the side peripheral surface of each of the electrode terminals.

6. The electrical storage module according to claim 4, wherein the at least one fixing member is fixed to the bus bar by inserting an insertion portion formed in the at least one fixing member into a hole formed in the bus bar and locking a locking portion formed near a tip end of the insertion portion to an opening edge of the hole.

7. The electrical storage module according to claim 4, wherein a flange is formed on the side peripheral surface of each of the electrode terminals at a part above the at least one fixing member, and the flange overlaps the at least one fixing member when a corresponding one of the electrical storage device is viewed from above.

8. The electrical storage module according to claim 1, wherein an upper surface of each of the electrode terminals is exposed from the bus bar when viewed in the second direction.

9. The electrical storage module according to claim 1, wherein the bus bar connects same poles of the electrode terminals of the plurality of electrical storage devices to each other.

10. An electrical storage module comprising:

a plurality of electrical storage devices arranged in a first direction; and a bus bar that connects electrode terminals of the plurality of electrical storage devices to each other, wherein:

each of the plurality of electrical storage devices includes an outer covering can including an opening, and a sealing body that is provided with a corresponding one of the electrode terminals and is inserted into the opening of the outer covering can and the sealing body being plate-shaped, each of the electrode terminals has a columnar shape protruding along a second direction in which the sealing body is inserted into the outer covering can of a corresponding one of the plurality of storage devices and crosses the first direction and having a side peripheral surface extending in the second direction, each of the electrode terminals includes a container that is disposed at the side peripheral surface and the container includes a through-hole or a recess extending in a third direction substantially orthogonal to the second direction, the through-hole or the recess of each of the electrode terminals has an opening, which opens to the side peripheral surface, the opening of the through-hole or the recess of each of the electrode terminals has a width in the first direction and a length in the second direction, the length is greater than the width, the through-hole or the recess of each of the electrode terminals has a depth in the third direction, the bus bar includes press-fitting portions, and a corresponding one of the press-fitting portions is press-fitted along the third direction into the container of each of the electrode terminals.

11. The electrical storage module according to claim 10, wherein the container extends in a direction intersecting a direction in which a plurality of the electrical storage devices are arranged.

12. The electrical storage module according to claim 10, wherein:

the through-hole or the recess of the container includes inner surfaces facing with each other, and the corresponding one of the press-fitting portions is formed by bending a long metal sheet, and is formed in a substantially V shape having an apex before the corresponding one of the press-fitting portions is press-fitted into the container, and the apex is inserted into the through-hole or the recess of the container.

13. The electrical storage module according to claim 10, further comprising at least one fixing member that fixes each of the electrode terminals and the bus bar.

14. The electrical storage module according to claim 13, wherein the at least one fixing member is disposed to surround the side peripheral surface of each of the electrode terminals.

15. The electrical storage module according to claim 13, wherein the at least one fixing member is fixed to the bus bar by inserting an insertion portion formed in the at least one fixing member into a hole formed in the bus bar and locking a locking portion formed near a tip end of the insertion portion to an opening edge of the hole.

16. The electrical storage module according to claim 13, wherein a flange is formed on the side peripheral surface of each of the electrode terminals at a part above the at least one fixing member, and the flange overlaps the at least one fixing member when a corresponding one of the electrical storage device is viewed from above.

17. The electrical storage module according to claim 10, wherein an upper surface of each of the electrode terminals is exposed from the bus bar when viewed in the second direction.

18. The electrical storage module according to claim 10, wherein the bus bar connects same poles of the electrode terminals of the plurality of electrical storage devices to each other.

* * * * *